H. H. HUBBARD.
RECORDING APPARATUS.
APPLICATION FILED APR. 1, 1919.

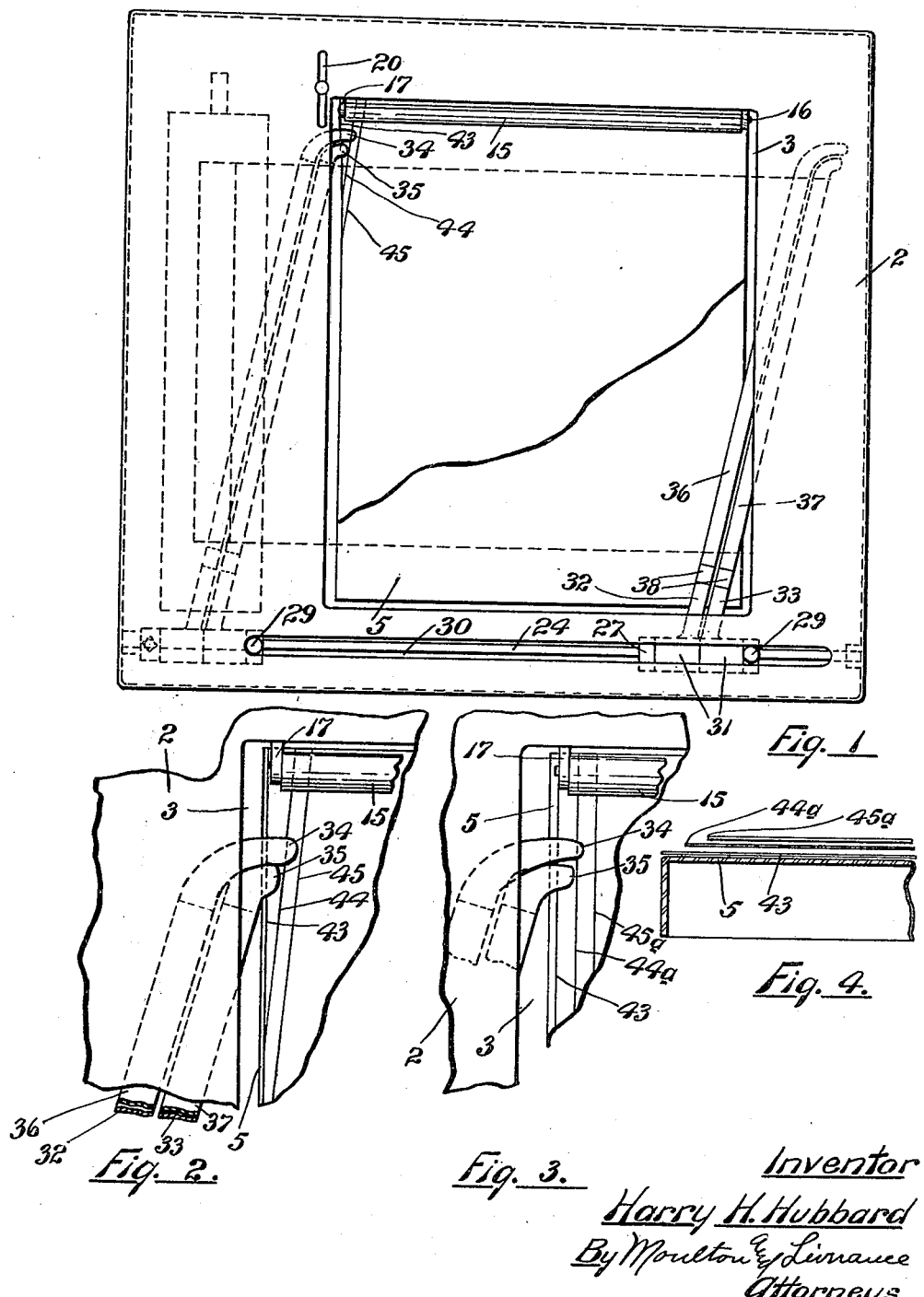

1,394,733.

Patented Oct. 25, 1921.

Inventor
Harry H. Hubbard
By Moulton & Livrance
Attorneys

H. H. HUBBARD.
RECORDING APPARATUS.
APPLICATION FILED APR. 1, 1919.
1,394,733.
Patented Oct. 25, 1921.
4 SHEETS—SHEET 3.
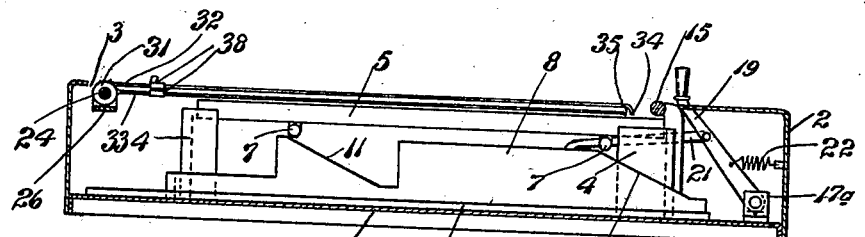
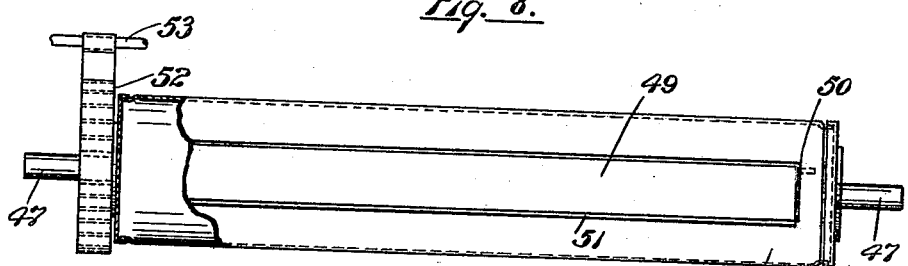
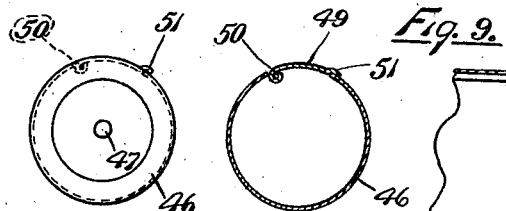
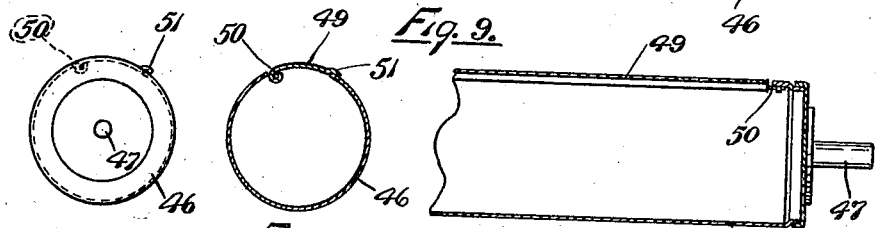
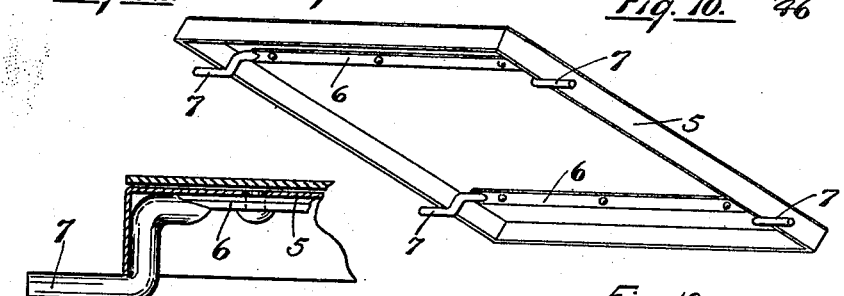
Inventor
Harry H. Hubbard
By Moulton & Lurrance
Attorneys

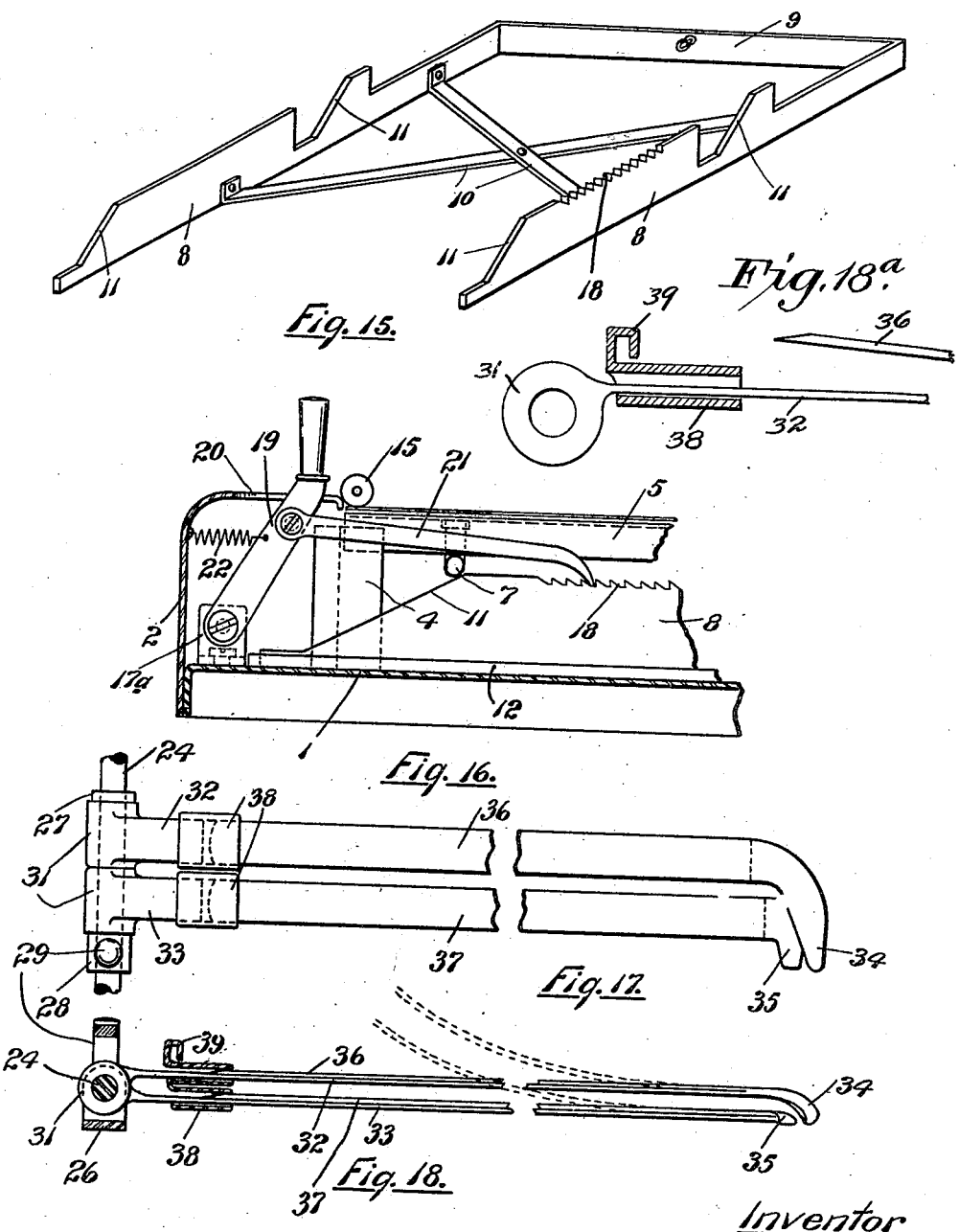

UNITED STATES PATENT OFFICE.

HARRY H. HUBBARD, OF GRAND RAPIDS, MICHIGAN.

RECORDING APPARATUS.

1,394,733.           Specification of Letters Patent.     Patented Oct. 25, 1921.

Application filed April 1, 1919. Serial No. 286,752.

*To all whom it may concern:*

Be it known that I, HARRY H. HUBBARD, a citizen of the United States of America, residing at Grand Rapids, in the county of Kent and State of Michigan, have invented certain new and useful Improvements in Recording Apparatus; and I do hereby declare the following to be a full, clear, and exact description of the invention, such as will enable others skilled in the art to which it appertains to make and use the same.

This invention relates to a recording apparatus, being particularly concerned with the production of a mechanism in which a plurality of copies may be made simultaneously with an original by use of proper carbons between the different sheets or papers on which the original and copies are to be made. It is a primary object and purpose of the invention to provide a means whereby one or more duplicating carbons may be very readily introduced between flat sheets of paper such as bills, invoices, bills of lading and the like, so that an automatic reproduction of the original may be made as many times as is necessary with the making of the original, said carbons being readily removable when their purpose is served to original position so as to be ready for use again with a succeeding similar operation, the carbons being between the papers only while the actual making out of the original and copies thereof is taking place. A further object of the invention is to produce a machine which is capable of using flat sheets on which the original and duplicates are made, rolls of paper being entirely dispensed with. A still further object is to produce a machine in which different sizes of bills or similar papers may be made out without change of the machine. Subsidiary to these main objects are many minor objects and purposes, all of which will appear fully and in detail as understanding of the invention is had and a knowledge of the many novel constructions for attaining these ends are obtained from the following description, taken in connection with the accompanying drawings illustrating the invention, in which drawings, Figure 1 is a plan view of the device, the carbon moving fingers being shown in two positions.

Fig. 2 is a fragmentary plan view illustrating the one manner of cutting the paper for operation of the carbon moving and inserting fingers between the sheets thereof.

Fig. 3 is a similar view of a modified way of cutting the sheets of paper.

Fig. 4 is a fragmentary vertical section taken through the paper carrying table and a set of papers thereon cut in the manner shown in Fig. 3.

Fig. 8 is a vertical section through the device taken adjacent the right hand side of Fig. 1.

Fig. 9 is a partial plan and sectional view illustrating the carbon roller.

Fig. 10 is a fragmentary longitudinal vertical section, Fig. 11, a vertical transverse section, and Fig. 12 an end view of said carbon roller.

Fig. 13 is a perspective view of the paper holding table.

Fig. 14 is a fragmentary enlarged transverse vertical section through the table at one end thereof.

Fig. 15 is a perspective view of the automatic table elevating member which forms one element of the device.

Fig. 16 is a somewhat enlarged section and side view of a mechanism for manually lowering the paper holding table.

Fig. 17 is a plan view of the carbon moving and inserting fingers.

Fig. 18 is a partial sectional and side view thereof, and

Figure 5:
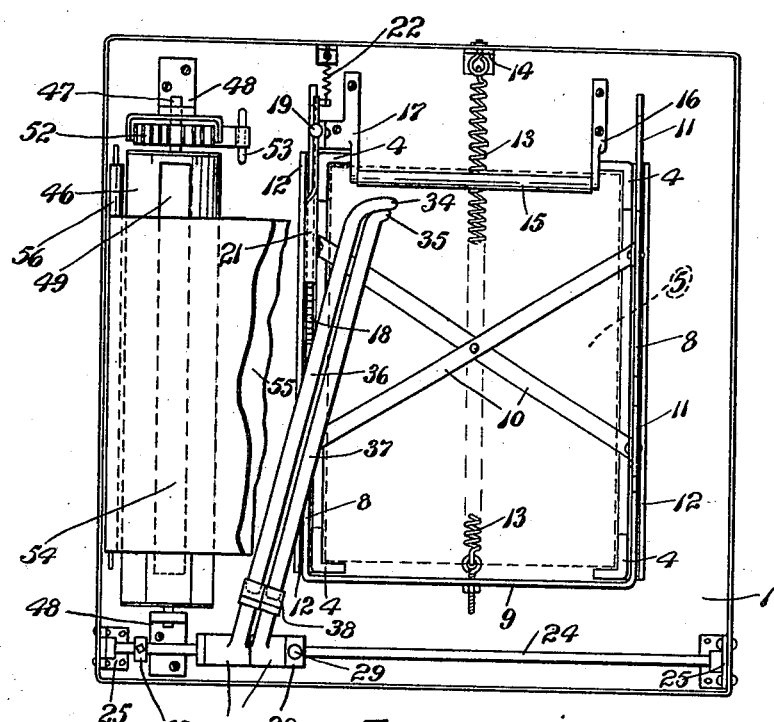
Fig. 5 is a plan view, with parts broken away and removed to disclose the working parts of the mechanism and their operative relation to each other.

Fig. 18ª is a fragmentary view similar to Fig. 18 showing the ends of the carbon fingers separated.

Like reference characters refer to like parts in the different views of the drawings.

The mechanism of the device is carried and supported by a suitable base 1 and is covered and inclosed by a casing 2 in the upper side of which a rectangular opening 3 is made as large or a little larger than the largest size of bill or sheet of paper to be used in the working of the device. From the base four corners posts 4 project upwardly, being of angle iron form in cross section so as to serve as guides for the corners of a rectangular paper carrying table 5, which is located directly under the rectangular opening 3 in the casing 2. This table may be made of sheet metal and have cross bars 6 in spaced relation on its under side from which trunnions 7 extend beyond the sides of the table as shown. The table is carried on a member having spaced apart sides 8 connected at their front ends by a cross member 9, the sides being braced by braces 10, while adjacent their free ends and at an intermediate point in their lengths, parts of the sides 8 are cut away to provide inclines 11 against which the trunnions 7 bear. The sides 8 are slidably mounted in guides 12 secured to the base 1 and a coiled spring under tension is connected at one end to the front cross member 9 and at the other to any suitable fixed bracket, the tendency of the spring being to move the said table carrying member rearwardly whereby with the trunnions 7 on the inclines 11, the table is elevated until its farther or rear end strikes against a roller 15 mounted on and between two brackets 16 and 17, in turn fixed to the base 1. It is evident that the table is thus automatically moved upward as far as roller 15 will let it go and at the same time held in horizontal position, or at least parallel to the lower edges of the sides 8; and that any sheets of paper on the table are held at their upper ends between the table and roller and cannot accidentally get displaced therefrom.

At times it is desirable to lower the table so that papers thereon may be removed, particularly after an original and duplicate copies have been made. To this end one of the sides 8 at its upper edge and near its rear end is formed with a plurality of teeth 18. A lever 19 is pivotally connected at its lower end to an extension 17ª of bracket 17, passing upwardly through a slot 20 in the casing 2 in ready position for manual operation. A finger 21 is attached to the lever 19, extending forward therefrom and being formed at its free end so as to engage between any two consecutive teeth 18 when the lever 19 is pulled forward. Normally the lever 19 is pulled to the rear by a spring 22, and the finger 21 elevated, but whenever the lever is grasped and pulled forward the finger 21 is brought into engagement between two of the teeth 18 on one of the sides 8 of the table supporting member and said member as a whole is moved forward against the force of spring 13, the table being lowered as trunnions 7 slide down the inclines 11. The papers on the table are therefrom freed and can be removed wholly or partly, or, if desired, additional papers may be placed on the table, as is obvious.

A frame 23 surrounds the table 5, being made from any suitable material and supported in any suitable manner, preferably, being disconnected from the base so that it may be removed easily. A rod 24 is located at the front of the device, being carried on supporting brackets 25 at its ends in parallelism to the width of the table. A yoke having a bar 26 under the rod 24 with upstanding ends 27 and 28 is slidably mounted on the rod 24, a knob 29 projecting upwardly from the end 28 through a long slot 30 in the case 2 whereby the yoke and attached parts may be moved lengthwise of rod 24. Two sleeves 31 are mounted end to end on the rod 24 between the ends 26 and 27 from which flat metal bars 32 and 33 extend to the rear and inwardly at an angle, terminating, respectively, in inturned fingers 34 and 35 and then being turned back on themselves to form upper clamping bars 36 and 37, the ends of which are at a short distance from the sleeves 31 and which may be clamped to the lower bars 32 and 33 by movable clamping sleeves 38, each being equipped with an upstanding operating lip 39 so that the sleeves may be readily moved to free the upper bars 36 and 37 of the clamps or again moved to hold the same in clamping position. It is evident that the clamping devices thus described are both pivotally and slidably mounted on rod 24 and may be moved in unison over the paper holding table, or turned independently of each other in an upward direction when the covering casing 2 is removed, which, it is designed, may be readily done.

Figure 7:
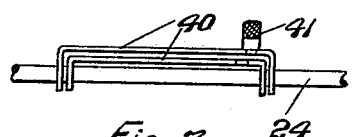
Fig. 7 is a fragmentary elevation illustrating a preferred method of slidably and pivotally mounting the carbon moving and inserting fingers.

The construction while operative is not preferred as it practically limits the device to two of said clamping bars or fingers. It will be noted that the clamping finger consisting of the bars 32 and 36 is located in a plane above the other, is farther away from the table, and that its finger end 34 projects farther forward than the similar finger end 35. This is desirable for the operation of the machine as later described, and all of these features may be attained and a greater or less number of the fingers used at will by using the construction illustrated in Fig. 7. Here two yokes 40, one shorter and with shorter downturned ends are mounted on the rod 24, both pivotally and slidably, one of the yokes practically nesting within the other, and it is evident that the number of yokes may be indefinitely increased, or one of those shown may be removed without affecting the remaining construction or the operation of the machine. The operating knob 41 is attached to the outer yoke detachably, as by screw threaded connection and each yoke may have a threaded opening with which said knob may connect should an outer one be removed. A finger will be connected with each yoke, moving therewith, and in all instances, the yokes within which others nest will be equipped with clamping fingers located in a plane above the fingers on the inner yokes and with the fingers at the ends of the upper members extending beyond the ends of those in a lower plane. A stop collar 42 is adjustably mounted on the rod 24 and limits the movement of the clamping fingers in one direction so as to stop the ends 34 and 35 at proper points with relation to the sheets of paper carried on the table that when moved across the table said fingers will insert between the sheets and move entirely across the table between different sheets of paper.

The paper placed on the table when two of the fingers are used as shown, are made up in sets of three sheets, the lowermost of which has an edge 43 paralleling the adjacent edge of the table. The next upper sheet has a portion cut away at its upper corner where the lower finger 35 comes so as to make a partial edge 44 located at an angle to the edge of the table and positioned immediately beyond the end of the finger 35 which, however, rests on the lower sheet having the straight edge 43. In like manner the upper sheet of the series has its similar corner cut at an angle but still farther in as indicated at 45, such edge being located beyond the end of the upper finger 34 which rests on the second sheet having the angular corner edge 44. The same result may be effected by cutting the edges of the intermediate and upper sheets parallel to the edge of the lower sheet but farther in as indicated at 44$^a$ and 45$^a$ in Fig. 3; and it is obvious that if one finger only is used the papers are put up in series of two and if more than two fingers are used the papers are put up in series containing one more sheet than there are fingers and with edges cut so that each finger rests on a different sheet so that when the fingers are moved they pass over the sheet on which each rests and under the sheet next above.

A hollow roller 46 provided with trunnions 47 at its ends is rotatably mounted on and between brackets 48 fixed to the base 1, the roller being located substantially parallel to the sides of the table. In one side of the roller a door section 49 is pivotally mounted on a pin 50 lengthwise of the roller and closes a longitudinal opening in the roller, the door being provided at its free edge with a lip 51 to bear against the roller at an edge of the opening. It is designed that said door shall normally close by spring pressure causing the lip to bear with a light pressure against the roller. The roller is normally turned in a direction away from the table by a spring 52 of the band type, one end of which is attached to one of the trunnions 47 and the other to any suitable stationary rod 53. The tension of the spring is light, sufficient only to wind up the carbons 54 and 55 around the roller when they are drawn out as later described.

Figure 6:
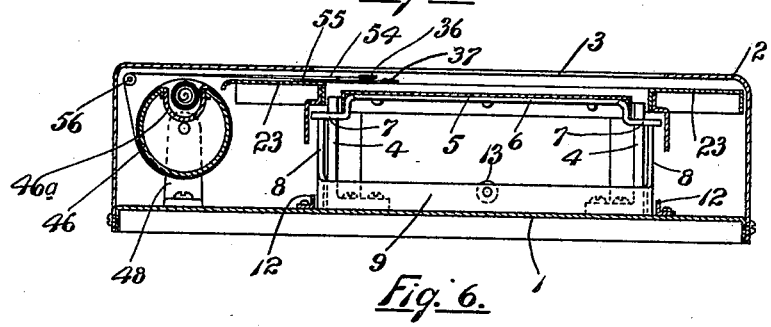
Fig. 6 is a vertical section taken through the device adjacent the front end thereof.

Within the roller a roll of carbon paper is placed from which two ends lead around a guide roller 56 to the fingers heretofore described, these two carbon ends being indicated at 54 and 55 in Fig. 6. The ends of the carbons are clamped between the bars 32 and 36 and 33 and 37 and enough of the carbons is pulled out of the roller 46 that when the carbon carrying fingers are moved across the table to the opposite side, or beyond the right hand position of the fingers shown in Fig. 1, that inside of the roller will not be affected. When the fingers are moved to the left until stopped by collar 42, the portions of the carbons out of the roller wind around the same under the influence of the spring 52. As before stated the strength of spring 52 is sufficient only to turn the roller to wind up this outer portion of carbon paper but is not enough to pull the attached fingers back after they have once been moved across the table and between the sheets. It is obvious that with the carbons attached to the fingers, when said fingers are passed over the table and between the sheets of paper as previously described, a carbon is inserted between consecutive sheets of paper, one under the uppermost sheet and one under the next to the upper sheet, where the two carbon finger construction is used; and if more or less of the fingers are used there are merely more or less carbons inserted between the consecutive sheets. It is obvious that when thus inserted any matter written on the upper sheet is duplicated on those below over which carbons have been drawn.

With this construction of register or recorder, flat paper may be used cut to proper size for laying on the table. A large quantity of the sheets may be placed on the table, being made up in sets of three with the two finger construction shown and the uppermost sheet at its upper end is pressed against the roller 15. After the carbon carrying fingers have been passed between the sheets of the upper set, drawing the carbons after them, and an original and two duplicate records made as desired, the fingers are moved back, handle 19 grasped and the three uppermost sheets on which the record has been made removed, and the operation may be indefinitely repeated as long as the papers hold out, after which a new pack of papers in sets of three with edges properly cut may be placed on the table and the operations continued.

The roller is a container for the carbon supply and whenever the carbon outside of the roller becomes worn out through use the securing sleeves 38 are moved to release the upper bars 36 and 37 and the worn out portions drawn through, after which the bars are clamped together and the worn out portions torn off. Then the fingers are moved over the table, this drawing fresh carbon from the supply within the roller, the spring actuated door 49 yielding sufficiently to permit this. When the fingers are moved back, the fresh carbon rolls around the roller as before. If desired an auxiliary holder for carbon as illustrated at 46ª may be placed lengthwise of the roller 46 to contain the carbon supply, the same type of door covering the same.

It is evident that sheets of various sizes may be placed on the table 5 either of the same dimensions or of less dimensions than the table. Any proper and suitable guides or alining means to hold the papers in proper position on the table may be supplied for the different sizes of papers used. With this construction it will be noted that the carbon is between the sheets of paper only when it is to be used and never stands for a length of time, such as over night for instance, with a resultant discoloration of the paper from the carbon. The use of flat paper is also of advantage, as with rolls of paper, the parts severed therefrom have a tendency to curl and are hard to file or to keep in good condition. Moreover, it is not necessary to have a special form or kind of paper for use in this machine nor to order from the maker of the machine with resultant delay, as the sheets may be cut and properly printed by any printing establishment. All of these features make the construction one of great merit while, in addition, the easy change of the machine so that it may be used to make any desired number of copies is a very valuable feature. The pivotal mount of each carbon finger independent of the others makes the change of carbon easy.

There are many changes in design and in minor detail of construction which may be resorted to in construction of the device, without in any way changing the invention. Accordingly, the construction outlined, while practical and operative, is not to be taken as limiting to the exact construction shown but rather as diagrammatic and illustrative of the invention, which is defined in the appended claims; and I consider myself entitled to all modifications of structure coming within the scope of such claims.

I claim:

1. In a device of the character described, a supporting table for carrying flat sheets of paper, and means mounted to move across the table and draw carbon or like reproducing paper over the table and between the sheets, said means being also movable in the opposite direction to disassociate the carbon entirely from the paper substantially as described.

2. In a device of the character described, a table on which a plurality of separate rectangular sheets of paper may be placed, and means mounted at one side of the table and mounted to be moved across the table to the opposite side and insert carbon paper or the like between uppermost sheets of the paper on the table, substantially as described.

3. In a device of the character described, a support on which a plurality of sets or series of papers are carried, means to hold the papers on the support, and means movably mounted and having carbon paper attached thereto and movable therewith, said means being movable transversely of the papers and inserting between the different papers of a set as it is moved in one direction and withdrawing the carbon paper entirely from the sets of paper when moved in the opposite direction, substantially as described.

4. In a device of the character described, a table on which a pack of papers formed into a series of sets each having an equal numbers of sheets in a set may be placed, means yieldingly elevating the table, a stop at the upper end of the table against which the upper ends of the papers are pressed to limit the elevation of the table and papers, and movable means having carbon papers attached thereto adapted to insert between the sheets of the uppermost set of papers and carry said carbon papers therebetween, said means being movable from one side to the other of the table and back, substantially as described.

5. In a device of the character described, a set of sheets of paper placed one over the other, each of the sheets except the lowermost sheet of the set having portions cut away at their upper ends and at one side, and with larger portions cut from each sheet progressively from the next to the lowest sheet to the uppermost sheet of the set, means to support and hold said set of papers, and a plurality of carbon inserting fingers having free ends resting on all of the sheets except the uppermost of the set, there being one less finger than there are sheets in the set, and movable across the set of papers to draw carbons between the sheets of the set, substantially as and for the purpose described.

6. In a device of the character described, a supporting table on which a plurality of sets of papers are adapted to be placed, each of said sets including a number of sheets of paper placed one over the other, a plurality of fingers one less than there are sheets of paper in a set of papers, means for mounting said fingers so that the same may be moved from one side of the papers to the other, carbons attached one to each finger, and interengaging means between the fingers and the papers of a set of papers whereby said fingers pass between and draw carbons one between the sheets of paper in the uppermost set of papers on the table, substantially as described.

7. A set of papers for use in a device of the character described, comprising a plurality of flat sheets located one over the other, said sheets except the lowermost sheet in the set having portions cut away at one side and with greater portions cut away from each succeeding sheet from the next to the lowermost sheet to the upper sheet in the set.

8. In a device of the character described, a table on which a plurality of sets of flat sheets of paper are adapted to be supported, means normally elevating the table, stop means at one end of the table to limit the extent of its elevation, a rod located at the other end of the table a distance therefrom, and a plurality of fingers slidably mounted on the rod and movable over the table, each of said fingers including lower and upper bars and means for detachably connecting the same at one end whereby each finger is adapted to clamp the end of a carbon sheet to it, and each finger at its free end being turned in toward the table to form an inserting end to guide the finger between said sheets of paper in a set on the table, substantially as described.

9. In a device of the character described, a table on which flat sheets of paper may be supported, a plurality of fingers normally located at one side of the table and having free ends turned in toward the table and normally located over the table at said side thereof, means for slidably mounting the other ends of the fingers whereby the same may be moved across the table and back, a roller rotatably mounted at the side of the table but farther away than the normal position of the fingers, carbon sheets, one for each finger wound around the roller, means on the fingers connecting the ends of said sheets to the fingers, and means tending to turn the roller to wind the carbon sheets around it, substantially as described.

10. In a device of the character described, a table, trunnions projecting in spaced apart relation at opposite sides of the table, a base support, guides on the base, a member having two spaced apart sides connected at one end by a cross piece slidably mounted in said guides, spring means for moving said member in one direction, the sides of said member having portions cut at an incline on which the table trunnions rest whereby the table is normally elevated under the influence of the spring means, and a stop member located above one end of the table and extending substantially its full width to limit the elevation of the table, substantially as described.

11. In a device of the character described, the elements in combination claimed in claim 10, combined with means for manually operating said member against the spring means in the opposite direction to thereby lower the table and release articles held on the table between it and the stop member.

12. In a device of the character described, the elements in combination claimed in claim 10, combined with a lever pivotally mounted at its lower end and extending upwardly from the base, said lever being located adjacent one end of the stop member, a finger on the lever extending over one side of said table carrying member, said side being formed with a plurality of notches between any two of which the end of the finger is adapted to engage, and a spring normally moving the lever in one direction to lift the finger away from the notched side of said member.

13. In a device of the character described, a table for carrying sets of sheets of paper, fingers, one less than the number of sheets in a set mounted to move over the table, a hollow roller mounted for rotation at one side and lengthwise of the table, a spring actuated door in a side of the roller extending lengthwise thereof, a roll of carbon paper within the roller and having ends thereto passing under the door, one for each finger, means on the fingers for connecting said ends to the fingers, and means for winding the roller in a direction to wind the carbon outside of the roller around the same, substantially as described.

14. In a device of the character described, a hollow roller having a longitudinal opening in one side, a pivotally mounted spring actuated door for yieldingly closing the opening, means for rotatably mounting the roller, and means for yieldingly turning the roller in one direction, substantially as and for the purposes set forth.

15. In a device of the character described, a table adapted to carry sheets of paper thereon, means for automatically elevating the table, means limiting the upward movement of the table so as to hold the uppermost sheet of paper thereon in a predetermined plane, fingers located at one side of the table, means for mounting the fingers so that the same may be pivotally and slidably moved, said pivotal movement of the fingers being in an upward direction and of each finger independently of the other and said slidable movements being back and forth over the table, the fingers moving in unison, a roller, means for rotatably mounting the roller to turn in one direction, carbon on the roller and having ends, one for each finger, attached to the fingers, and means for manually moving the fingers back and forth over the table to insert the carbon between the uppermost sheets of paper on the table and remove the same from between said sheets.

16. In a device of the character described, a table, a set of papers comprising a number of sheets placed one over the other carried on the table, fingers, one less than the number of sheets in said set of papers located at one side of the table, the fingers farthest from the table being in progressively higher planes, said fingers having free ends resting on the different sheets of the set of papers except the upper sheet, and with the fingers in lower planes resting on the lower sheets of the set, means for mounting the opposite ends of the fingers so that the fingers may be moved back and forth over the table and between the sheets, carbon sheets secured one to each finger which are drawn between the sheets of the set as the fingers are moved over the table, and means for pulling the carbon sheets back as the fingers are moved back over the table, substantially as described.

17. In a device of the character described, a table for removably carrying sheets of paper in sets superimposed upon each other, each set including a number of sheets, and means for inserting carbon paper between and removing it from the sheets of paper in the uppermost set, substantially as described.

18. In a device of the character described, means for removably holding sheets of paper in sets, each set including a number of sheets located one over the other, and the sets of sheets also being placed one over the other, and means for inserting carbon paper between the sheets of the uppermost set, entering it at one side of the set of sheets, and for removing it from between the sheets, substantially as described.

19. In a device of the character described, a support for sets of flat sheets of paper placed one over the other, each set including a number of sheets of paper, and means for carrying carbon paper between the sheets of the uppermost set of sheets and removing it entirely from the paper, substantially as described.

20. In a device of the character described, a support for flat sheets of paper placed one over the other in sets, each set including a number of sheets of paper, and mechanical means for inserting carbon paper or like reproduction means between the sheets of the uppermost set of sheets of paper on the support and entirely withdrawing it from all of the sets of papers.

21. In a device of the character described, a set of papers comprising a plurality of flat sheets of paper of rectangular shape, said sheets, except the lowermost one of the set, having portions cut away at one portion and at an outer edge thereof of said sheets, said portions cut from the different sheets being differently cut, substantially as and for the purposes described.

22. In a device of the character described, a support having a series of sheets of paper placed one over the other, and means movably mounted to pass from one edge of the sheets to the other and between said sheets, said means having carbon paper or like reproduction means attached thereto which is drawn between the sheets on movement of said means in one direction and entirely disassociated therefrom on movement in the opposite direction, substantially as described.

In testimony whereof I affix my signature.

HARRY H. HUBBARD.